United States Patent
Reed et al.

(10) Patent No.: US 7,725,997 B2
(45) Date of Patent: Jun. 1, 2010

(54) BUTTON HEAD LUBRICATION FITTING PRESSURE RELEASE TOOL

(76) Inventors: Duane Lee Whitney Reed, 8404 Bvanift, Houston, TX (US) 77061; Brian Kingsley Reed, 8404 Bvanift, Houston, TX (US) 77061

( * ) Notice: Subject to any disclaimer, the term of this patent is extended or adjusted under 35 U.S.C. 154(b) by 222 days.

(21) Appl. No.: 11/998,506

(22) Filed: Nov. 30, 2007

(65) Prior Publication Data

US 2009/0205185 A1    Aug. 20, 2009

Related U.S. Application Data

(60) Provisional application No. 60/872,054, filed on Nov. 30, 2006.

(51) Int. Cl.
*B25B 27/00* (2006.01)

(52) U.S. Cl. .............................. 29/278; 29/270; 29/255

(58) Field of Classification Search .................... 29/278, 29/255, 270–277
See application file for complete search history.

(56) References Cited

U.S. PATENT DOCUMENTS

| | | | | |
|---|---|---|---|---|
| 2,562,419 | A * | 7/1951 | Ferris | 29/243.519 |
| 4,799,832 | A * | 1/1989 | Abbott | 408/123 |
| 6,609,283 | B1 * | 8/2003 | Somerville | 29/262 |
| 6,643,904 | B1 * | 11/2003 | Hedspeth | 29/278 |
| 6,904,653 | B2 * | 6/2005 | Bates | 29/235 |
| 6,929,024 | B1 * | 8/2005 | Rucker | 137/315.41 |
| 7,007,359 | B2 * | 3/2006 | Wilson | 29/244 |
| 2009/0205185 | A1 * | 8/2009 | Reed et al. | 29/278 |

* cited by examiner

*Primary Examiner*—Lee D Wilson
(74) *Attorney, Agent, or Firm*—Delphine James

(57) ABSTRACT

The present invention is a pressure release tool for a button head lubrication fitting. The tool comprises a handle assembly securely engaged with the body portion of the tool. The bottom section of the tool is adapted to securely engage with the top of the button head lubrication fitting.

5 Claims, 2 Drawing Sheets

BUTTON HEAD LUBRICATION FITTING PRESSURE RELEASE TOOL

This is a continuation of U.S. Pat. No. 60/872,054 filed Nov. 30, 2006.

BACKGROUND

The present invention relates to a pressure release tool for a button head fitting. One of the basic procedures required in good valve maintenance is the replacement of corroded or damaged button head lubrication fittings. Generally, the button head lubrication fitting screws into a lubricated plug valve.

The majority of lubricated valves are designed with either one or two internal check valves which are located in the valve beneath the button head lubrication fitting. If these internal check valves are present and holding pressure, it is possible to remove the button head lubrication fitting from the valve and replace it with a new one. In the past it was impractical to be sure the internal check valves were holding pressure or not. The present invention provides a safety tool for the removal of button head lubrication fittings when the internal check valves are holding pressure.

BRIEF DESCRIPTION OF DRAWINGS

FIG. 2 shows the button fitting the tool fits on.

DETAILED SPECIFICATIONS

Figure 3:
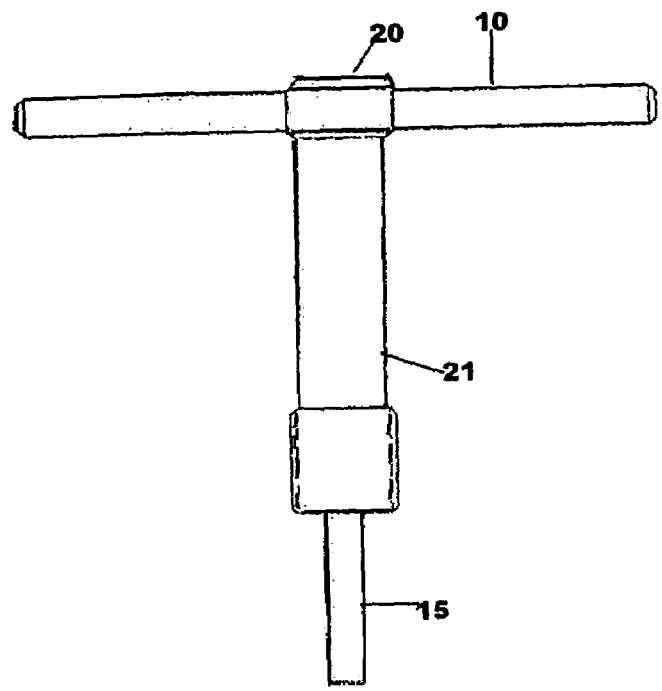
FIG. 3 shows the handle assembly of the present invention
Figure 1:
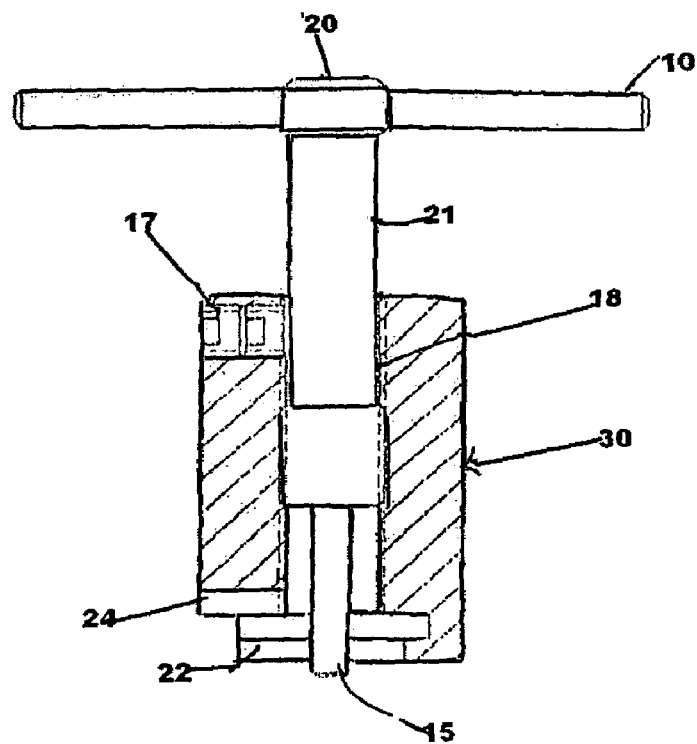
FIG. 1 shows the Button Tool of the present invention in a front side view
Figure 2:
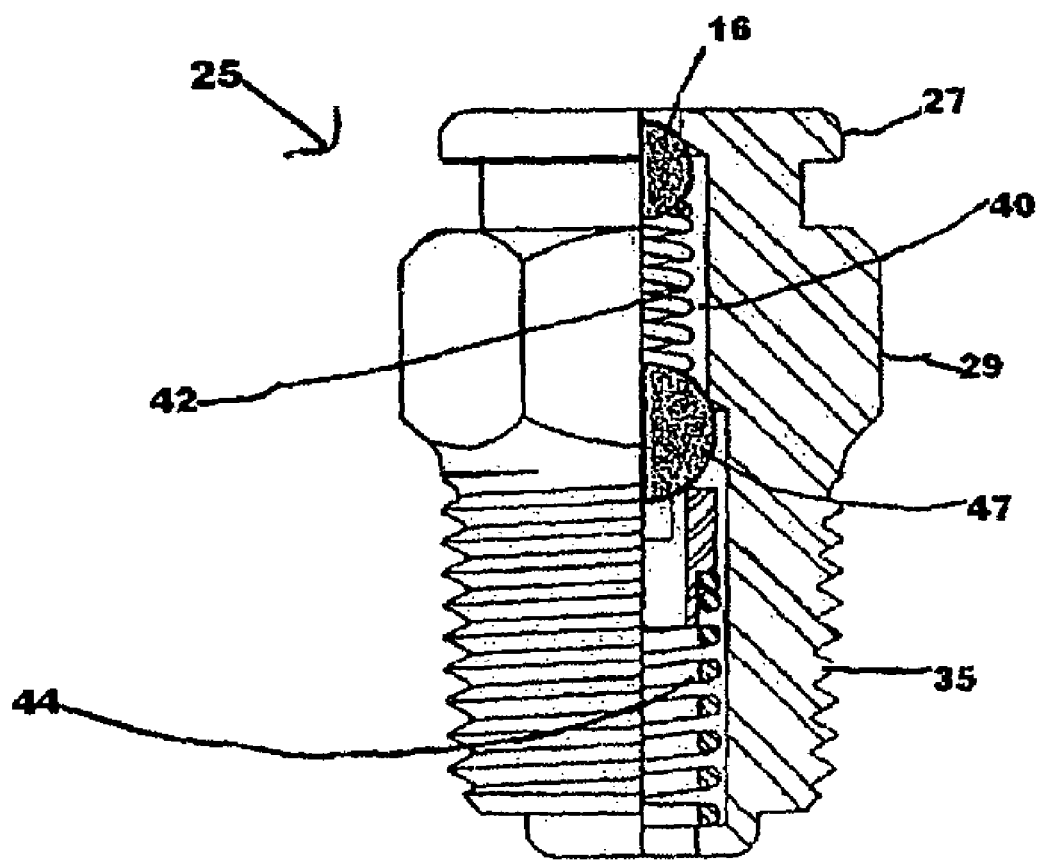

With reference to FIGS. 1, 2, and 3, the detailed embodiment of the present invention is disclosed herein. The disclosed embodiment is not to be interpreted as limited, but merely as a basis for teaching one skilled in the art to make and/or use the present invention.

The tool 1 comprises a handle assembly 20 and body portion 30. The tool can be manufactured utilizing various materials such as carbon steel as well as but not limited to brass, stainless steel, and inconel. Tool 1 is designed to bleed any check valve accessible by a quick connect fitting 27 as shown in FIG. 2. Specifically, this tool is preferable used to connect to a button head fitting with an accessible check valve.

A T-shape handle assembly 20 formed by a horizontal lever 10 perpendicularly mounted atop a continuous single piece elongated stem 21. Stem 21 extends vertically downward and is segmented into a top portion 22 and a bottom portion 23. Bottom portion 23 extends downward forming stinger 15 which has a slightly smaller diameter than top portion 22. In use, stinger 15 travels downward and depresses check ball 16 to release the pressure from the button head lubrication fitting 25 shown in FIG. 2.

Tool 1 further comprises a cylindrical shape body portion 30 which is further defined by a top section 21 and a bottom section 22 that is adapted to cooperatively engage with top 27 of button head lubrication fitting 25 shown in FIG. 2. In the preferred embodiment bottom section 22 is recessed inwardly to fit slidably over and securely engage with the top 27 of button head lubrication fitting 25. As depicted, body portion 30 further comprises an elongated bore 18 centrally located therethrough and into bottom section 22. Bore 18 is adapted to slidably receive stem 21. Set screw 17 extends horizontally through the top of body portion 30 and functions to secure the elongated stem 21 of handle assembly (20) in place within bore 18 of body portion (30). Bleed release port 24 is situated within the bottom section 22 of body portion (30).

As shown in FIG. 2, generally, button head lubrication fitting is has a body formed by a circular shape top portion 27, a hexagonal shape middle portion 29 and a threaded bottom portion 35. Aperture 40 extends downward through the center of the body of button head lubrication fitting. A check valve assembly is operationally situated within aperture 40. The check valve assembly comprises first check ball 16, second check ball 47 and supporting spring structures. First check ball 16 is situated within aperture 40 within the top portion 27 and second check ball 47 is situated within aperture 40 below first check ball 16 within the middle portion 29. The diameter of second check ball 47 is slightly larger than the diameter of first check ball 16. The diameter of aperture 40 within top portion 27 is slightly smaller than the diameter of aperture 40 within middle portion 29. However, aperture 40 extends downwardly through bottom section 35 at the same diameter as middle portion 29. First spring 42 is situated below first check ball 42 and second spring 44 is situated below second check ball 45. First check ball 16 and second check ball respectively depressing upon first spring 42 and second spring 44 controls the pressure released through bleed port 24.

This tool is a unique safety device designed to slide over the top of the button head lubrication fitting (25) shown in FIG. 2. Operationally, tool 1 is secured by turning the "T" handle assembly (20) in a clockwise direction, rotating the stinger (15) down into the lubrication fitting (25). Stinger 15 extends into check ball 16 and then the second check ball 47 is depressed against its individual spring within the lubrication fitting. This allows any residual gas, liquid, or other material to bleed off through bleed release port 24, and the checks ball(s) (16) to reseal. If the "blow (gas) or "flow" (liquid) does not cease, the fitting can be resealed by rotating the "T' handle assembly (20) counter-clockwise until the button head lubrication fitting reseals. As the pressure is release upward through check ball 16, the pressure travels at a right angle into bleed port 24 thereby releasing pressure within button head lubrication fitting 25. The bottom section of tool 1 can be adapted to fit upon any quick release type fitting with a check valve as shown in FIG. 2.

Other embodiments and optional configurations included with the present invention, as follows:

1. Button Head Lubrication Fitting Pressure Release Tool can be adapted or made to fit a ⅝" inch, ⅞" or other diameters on button head lubrication fittings.
2. A Stem Packing Assembly Option for sealing the stem assembly (21). This is to prevent possible leakage in the area engagement between the body portion (30) and the stem assembly (21). This option will fasten to the body portion (30) and surround and enclose stem (21) at the location where stem 21 enters the body portion (30), by way of a nut or screw or another suitable fastener.
3. Bleed release port cover option to cover the bleed release port (24) shown in FIG. 1 which deflects the released pressure. This cover will act as a safety option. This device will fasten to the body portion (30) at the bleed release port (24), and be fastened by a set screw of sorts.
4. Manually operated locking or clamping device to secure body portion (30) in place on the top portion of the button head lubrication fitting. This device is secured by set screw of sorts, fastened at the bottom section (22) of body portion (30).

What is claimed is:

1. A pressure release tool and a button head connector member for connecting to a button head with a lubrication fitting with a check valve for releasing pressure, the tool comprising:

a T shape assembly securely engaged with said button head connector member;

the T shape handle assembly having:

a lever perpendicularly mounted atop an elongated continuous single piece stem;

the elongated stem being defined by a top portion and a bottom portion; the bottom portion of the stem having a slightly smaller diameter than the top portion of the stem;

a first fastener member having a plurality of extending members disposed near the bottom portion of the elongated stem; and the button head connector member having:

a cylindrical shape body portion defined by a top section and a bottom section, a bore extending through the center of the body portion into the bottom section, the bore having a mating fastener member having a plurality of recessed members adapted to securely engage with the first fastener member wherein the elongated stem is securely engaged therein;

a second fastener member adapted to secure the elongated stem in place within the bore wherein said second fastener member is located horizontally within top portion of said button connector member, the disposed within the top section of the body portion;

a port for releasing pressure from the lubrication fitting, the port being disposed at a predetermined location within the bottom section of the body portion of said button head connector member, the bottom section of the body portion having a recessed portion adapted to securely receive a top portion of the lubrication fitting wherein the pressure release tool is securely attached to the button head lubrication fitting.

2. The tool of claim 1 wherein the second fastener member is a set screw horizontally extending at a predetermine location through the top section of the body portion into the bore wherein the button head connector member is securely engaged upon the lubrication fitting.

3. The tool of claim 2 wherein the port extends horizontally across the bottom portion of the body of the button head connector member forming a right angle with the bore.

4. The tool of claim 1 wherein the lubrication fitting further comprising:

a body defined by a circular shape lip portion, a hexagonal shape middle portion and a threaded bottom portion;

an aperture extending centrally through the center of the body of the lubrication fitting, the aperture adapted to operationally receive a check valve;

the bottom lubrication fitting forms a lip portion that is recessed inwardly.

5. The tool of claim 4 wherein as the lever is rotated the elongated stem extends downwardly through the bore into the aperture and depressing upon the check valve wherein pressure is released upwardly and through the port at a right angle.

* * * * *